US009875412B2

United States Patent
Hotta et al.

(10) Patent No.: US 9,875,412 B2
(45) Date of Patent: Jan. 23, 2018

(54) CROWD MONITORING SYSTEM AND CROWD MONITORING METHOD

(71) Applicant: HITACHI KOKUSAI ELECTRIC INC., Tokyo (JP)

(72) Inventors: Miyako Hotta, Tokyo (JP); Masanori Miyoshi, Tokyo (JP); Kazunari Iwanaga, Tokyo (JP); Mitsue Ito, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 0 days.

(21) Appl. No.: 15/117,552

(22) PCT Filed: Jan. 29, 2015

(86) PCT No.: PCT/JP2015/052586
§ 371 (c)(1),
(2) Date: Aug. 9, 2016

(87) PCT Pub. No.: WO2015/119044
PCT Pub. Date: Aug. 13, 2015

(65) Prior Publication Data
US 2016/0358027 A1    Dec. 8, 2016

(30) Foreign Application Priority Data
Feb. 10, 2014   (JP) ................. 2014-023618

(51) Int. Cl.
*G06K 9/00* (2006.01)
*H04N 7/18* (2006.01)
(52) U.S. Cl.
CPC ..... *G06K 9/00778* (2013.01); *G06K 9/00785* (2013.01); *H04N 7/18* (2013.01)
(58) Field of Classification Search
None
See application file for complete search history.

(56) References Cited

U.S. PATENT DOCUMENTS

2002/0168084 A1* 11/2002 Trajkovic ........... G06K 9/00778
                                                                         382/100
2008/0130948 A1*  6/2008 Ozer .................. G06K 9/00228
                                                                         382/103

(Continued)

FOREIGN PATENT DOCUMENTS

| JP | 11-219437 A | 8/1999 |
| JP | 2009-181307 A | 8/2009 |
| JP | 2012-025495 A | 2/2012 |

OTHER PUBLICATIONS

Kiyotaka Watanabe et al., "Crowd Monitoring System by Image Analysis", Proceedings of the 14th Image Sensing Symposium, (CD-ROM), May 2008.

(Continued)

*Primary Examiner* — Hadi Akhavannik
(74) *Attorney, Agent, or Firm* — Mattingly & Malur, PC

(57) ABSTRACT

This crowd monitoring system (MS) is provided with: a storage unit in which a plurality of images of a crowd including moving bodies are stored; a feature-value extraction unit which extracts a feature of each image; a number of persons input image selection unit which takes into account the distribution of the features, and selects, from among the images, a sample image for inputting the number of persons among the moving bodies; the number of persons input reception unit which displays, on a display unit, an input screen for inputting the number of persons among the moving bodies in the sample image, and receives an input of the number of persons among the moving bodies in the sample image; and a feature total number function generation unit which generates a function indicating the relationship between the features and the total number among the moving bodies.

18 Claims, 17 Drawing Sheets

(56) References Cited

U.S. PATENT DOCUMENTS

2009/0222388 A1* 9/2009 Hua .................. G06K 9/00778
706/12
2013/0077824 A1* 3/2013 Costa ................ G06K 9/00335
382/103

OTHER PUBLICATIONS

Antoni B. Chan et al., "Privacy Preserving Crowd Monitoring Counting People without People Models or Tracking", Appears in IEEE Conf. on Computer Vision and Pattern Recognition, Anchorage, 2008, pp. 1-7.
International Search Report of PCT/JP2015/052586 dated Apr. 14, 2015.

* cited by examiner

FIG. 2A
FIG. 2B
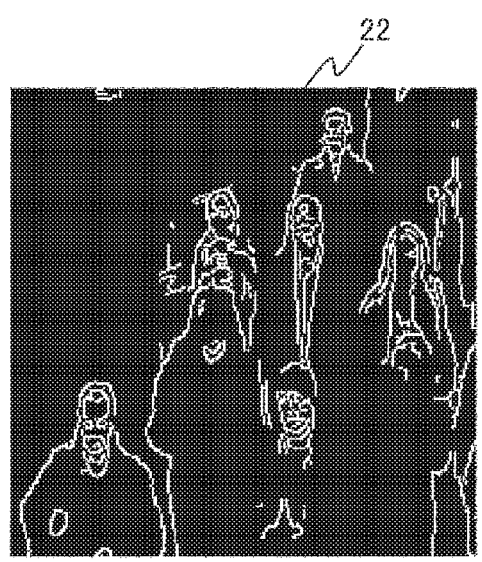

FIG. 7

| IMAGE ID | FEATURE | SELECTED IMAGE FLAG | NUMBER OF PERSONS |
|---|---|---|---|
| ⋮ | ⋮ | ⋮ | |
| A1 | 215 | 0 | |
| A108 | 218 | 0 | |
| A119 | 220 | 0 | |
| A41 | 228 | 0 | |
| A294 | 230 | 0 | |
| A3 | 231 | 0 | |
| A78 | 245 | 0 | |
| ⋮ | ⋮ | ⋮ | |
| A76 | 4345 | 0 | |
| A201 | 4415 | 0 | |
| ⋮ | ⋮ | ⋮ | |
| A887 | 22080 | 0 | |
| A1106 | 22294 | 0 | |
| A722 | 22390 | 0 | |
| A711 | 22488 | 0 | |
| A717 | 22588 | 0 | |
| A742 | 22870 | 0 | |

FIG. 9

| IMAGE ID | FEATURE | ERROR | SELECTED IMAGE FLAG |
|---|---|---|---|
| ⋮ | ⋮ | ⋮ | ⋮ |
| A1 | 215 | 14 | 1 |
| A108 | 218 | 11 | 1 |
| A119 | 220 | 9 | 1 |
| A41 | 228 | 1 | 1 |
| A294 | 231 | 2 | 1 |
| A3 | 232 | 3 | 1 |
| A78 | 245 | 16 | 0 |
| ⋮ | ⋮ | | ⋮ |
| A76 | 4345 | | 0 |
| A201 | 4415 | | 0 |
| ⋮ | ⋮ | | ⋮ |
| A887 | 22080 | | 0 |
| A1106 | 22294 | | 0 |
| A722 | 22390 | | 0 |
| A711 | 22488 | | 0 |
| A717 | 22588 | | 0 |
| A742 | 22870 | | 0 |

| IMAGE ID | FEATURE | SELECTED IMAGE FLAG | NUMBER OF PERSONS |
|---|---|---|---|
| ⋮ | ⋮ | ⋮ | |
| A1 | 215 | 1 | 0 |
| A108 | 218 | 1 | 1 |
| A119 | 220 | 1 | 1 |
| A41 | 228 | 1 | 1 |
| A294 | 231 | 1 | 1 |
| A3 | 232 | 1 | 1 |
| A78 | 245 | 0 | |
| ⋮ | ⋮ | ⋮ | ⋮ |
| A76 | 4345 | 0 | |
| A201 | 4415 | 1 | 8 |
| ⋮ | ⋮ | ⋮ | ⋮ |
| A887 | 22080 | 1 | 19 |
| A1106 | 22294 | 1 | 22 |
| A722 | 22390 | 1 | 17 |
| A711 | 22488 | 1 | 20 |
| A717 | 22588 | 1 | 18 |
| A742 | 22870 | 1 | 19 |

FIG. 12

| IMAGE ID | FEATURE | SELECTED IMAGE FLAG | NUMBER OF PERSONS |
|---|---|---|---|
| ⋮ | ⋮ | ⋮ | ⋮ |
| A1 | 215 | 1 | 0 |
| A108 | 218 | 1 | 1 |
| A119 | 220 | 1 | 1 |
| A41 | 228 | 1 | 1 |
| A294 | 231 | 1 | 1 |
| A3 | 232 | 1 | 1 |
| A78 | 245 | 2 | 1 |
| ⋮ | ⋮ | ⋮ | ⋮ |
| A76 | 4345 | 2 | 7 |
| A201 | 4415 | 1 | 8 |
| ⋮ | ⋮ | ⋮ | ⋮ |
| A887 | 22080 | 1 | 19 |
| A1106 | 22294 | 1 | 22 |
| A722 | 22390 | 1 | 17 |
| A711 | 22488 | 1 | 20 |
| A717 | 22588 | 1 | 18 |
| A742 | 22870 | 1 | 19 |

FIG. 15A
FIG. 15B
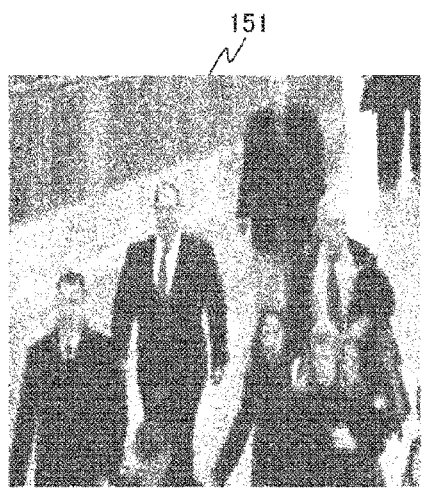
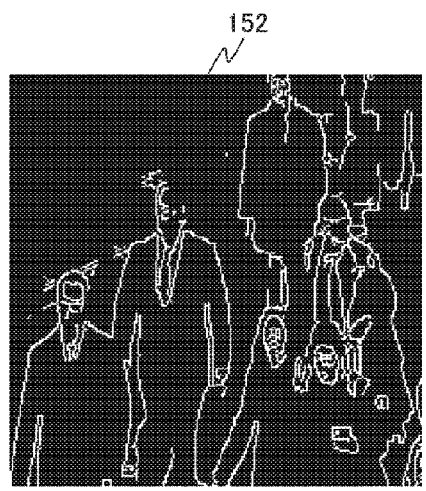
FIG. 16A
FIG. 16B
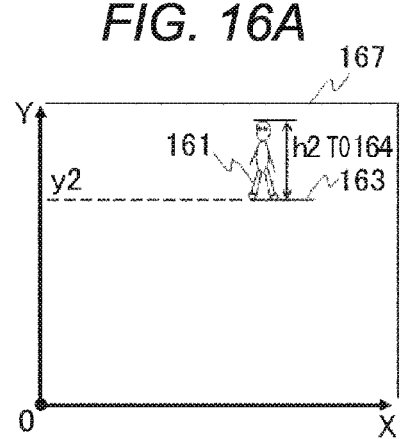
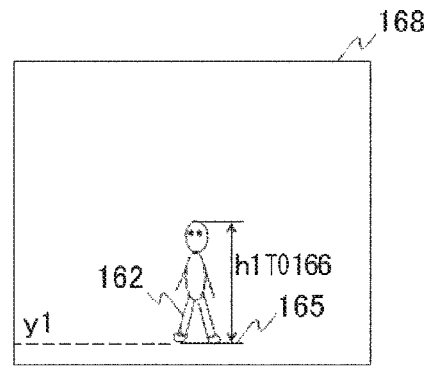

CROWD MONITORING SYSTEM AND CROWD MONITORING METHOD

TECHNICAL FIELD

The present invention relates to a crowd monitoring system and a crowd monitoring method which estimates a total number of a crowd from an image.

BACKGROUND ART

As social circumstances are changing, such as deterioration of public security, there is a growing need for grasping a congestion degree of a crowd from video of a surveillance camera to secure safety or relieve congestion. In video of a surveillance camera installed at a place where the height is restricted, such as an inside of a building, the installation height or the depression angle is limited, and the congestion degree needs to be grasped based on the assumption that persons are overlapped with each other in the screen. In this case, the number of persons cannot be counted one by one, and a method in which the congestion degree is calculated based on the relation between a feature in an image, such as the number of corners or an edge amount in the image, and the number of persons, is used as disclosed in PTL 1.

PTL 1 discloses that an approximate number of persons can be estimated from the number of corners as information related to the congestion degree, and congestion degree calculation unit holds a table associating the number of corners with the estimated number of persons to obtain the congestion degree.

PTL 2 discloses a method for measuring an escalator carrying load which includes steps of capturing a moving image from a camera, periodically sampling a still image from an input image, extracting a region to be measured from a cut-out still image, measuring an area of an image indicating a person in a photographed image, obtaining a regression coefficient from the area of the image indicating the person and the number of persons counted by a user from the same still image, and obtaining an area of an image indicating a person from each of a plurality of images periodically sampled, adding the areas of the images indicating of the person in each of the images, and calculating a total escalator carrying load based on the added area value and the regression coefficient.

CITATION LIST

Patent Literature

PTL 1: JP 2009-181307 A
PTL 2: JP 2012-25495 A

SUMMARY OF INVENTION

Technical Problem

PTL 2 further discloses that the processing is repeated to a several to several tens of cut-out images (S06), and the image to be used is an image cut out at arbitrary timing, but does not disclose that which image is to be cut out.

The method disclosed in PTL 2 cannot be practically established unless the numbers of persons in the selected images are dispersed. Specifically, when an arbitrary several to several tens of images are selected, an accurate regression coefficient cannot be calculated if the numbers of persons in the selected images are coincidentally the same.

It is unknown which image is to be selected to input the number of persons in order to obtain an accurate regression coefficient. Thus, conventionally, the numbers of persons of a large number of images have needed to be input, and a parameter setting cost (for example, labor cost) has been extremely high.

The present invention has been made to solve the above problems, and to provide a crowd monitoring system and a crowd monitoring method which can obtain an accurate relational expression between a feature and the number of persons while minimizing the number of images for inputting the numbers of persons by a user.

Solution to Problem

To achieve the above purposes, a crowd monitoring system according to the present invention includes storage unit configured to store a plurality of images of a crowd including a moving body, feature extraction unit configured to extract a feature of each of each of the images, sample image selection unit (for example, the number of persons input image selection unit 4) for selecting a sample image for inputting a total number of the moving bodies from each of the images taking a dispersion of the feature extracted by the feature extraction unit into consideration, total number input reception unit (for example, the number of persons input reception unit 5) for displaying, on display unit, an input screen to input the total number of the moving bodies in the sample image selected by the sample image selection unit, and for receiving the inputting of the total number of the moving bodies in the sample image, and feature/total number function generation unit (for example, feature/person-number function generation unit 6) for generating, based on the feature of the sample image selected by the sample image selection unit and the total number of the moving bodies received by the total number input reception unit, a function indicating a relation between the feature and the total number of the moving bodies.

Advantageous Effects of Invention

According to the present invention, it is possible to obtain an accurate relational expression between a feature and the number of persons while minimizing the number of images (sample images) for inputting the numbers of persons by a user.

BRIEF DESCRIPTION OF DRAWINGS

FIGS. 2A and 2B are diagrams illustrating an example in which edges are extracted from an image photographing a crowd, FIG. 2A is an image photographing a crowd, and FIG. 2B is an image obtained by extracting edges from the image of FIG. 2A.

FIG. 5A is a diagram illustrating an example of a selected point condition table, and FIG. 5B is a diagram illustrating an example of a selected point feature table.

FIG. 6A is a case of a population including 2,000 or more data, and FIG. 6B is a case based on 36 samples extracted from the population of FIG. 6A in a predetermined method.

FIG. 7 is an example of a selected image flag/the number of persons table in which input data is rearranged in ascending order of the feature.

FIG. 9 is a diagram illustrating an example of a work table for selected image flag at the time when processing in S88 is terminated.

FIG. 12 is a diagram illustrating an example of a selected image flag/the number of persons table when a selected image flag is "2".

FIGS. 15A and 15B are diagrams illustrating another example in which edges are extracted from an image photographing a crowd.

FIGS. 16A and 16B are diagrams of images that are photographed by the same camera at different times.

FIG. 17A is a two-dimensional image, FIG. 17B is an edge image, and FIG. 17C is a distance image.

DESCRIPTION OF EMBODIMENTS

Hereinafter, embodiments of a crowd monitoring system according to the present invention will be described in details with reference to the drawings.

First Embodiment

Figure 1:
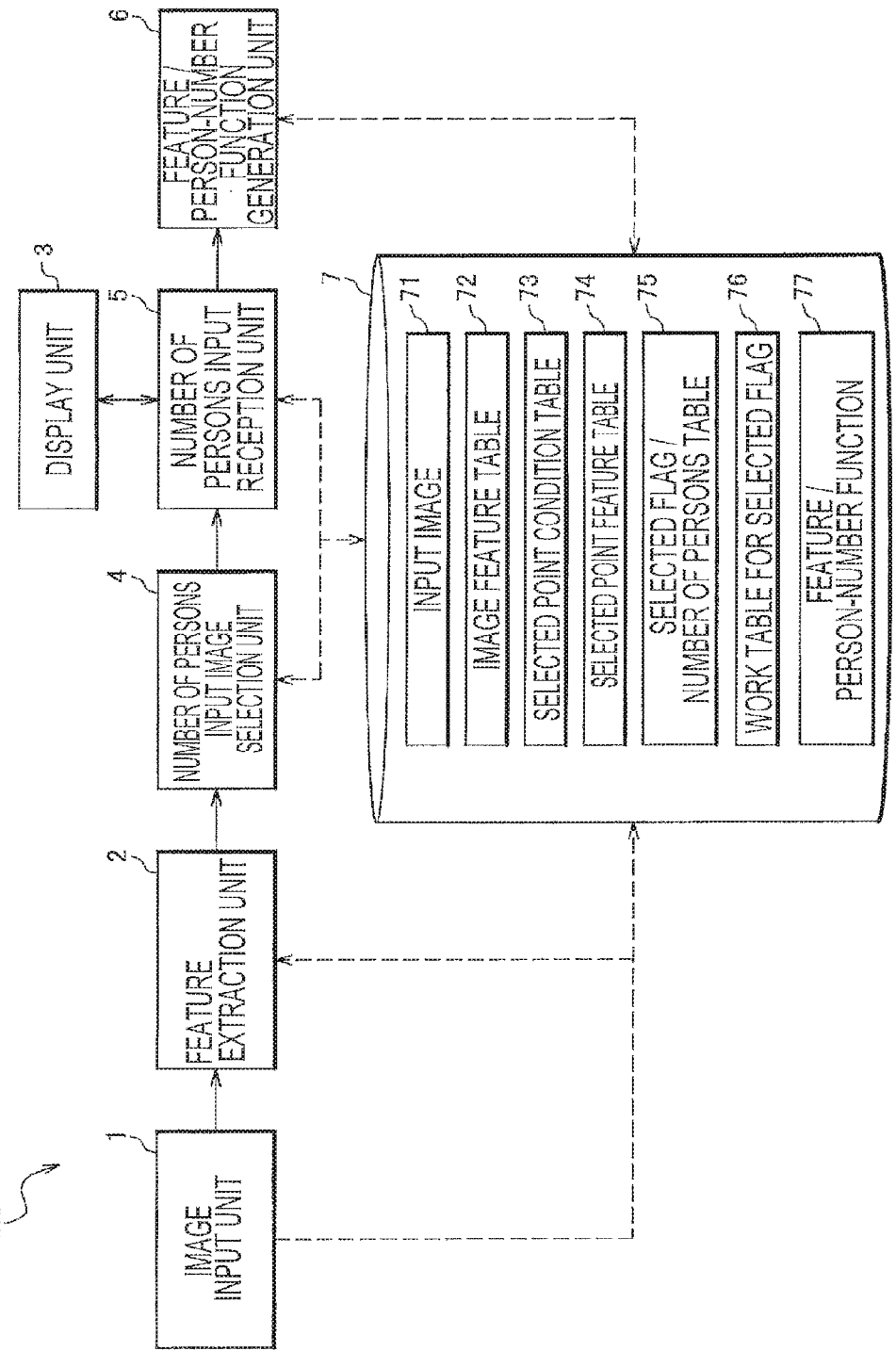
FIG. 1 is a block diagram illustrating a configuration of a first embodiment of a crowd monitoring system according to the present invention.

FIG. 1 is a block diagram illustrating a configuration of a first embodiment of a crowd monitoring system according to the present invention. A crowd monitoring system MS in FIG. 1 includes image input unit 1, feature extraction unit 2, display unit 3, the number of persons input image selection unit 4 (sample image selection unit), the number of persons input reception unit 5 (total number input reception unit), feature/person-number function generation unit 6 (feature/total number function generation unit), and storage unit 7. Note that, the number of persons is a true value of an image confirmed by a user, and a value received by the number of persons input reception unit 5 which will be described later.

The storage unit 7 stores a plurality of images 71 input from the image input unit 1 (input images), an image feature table 72 indicating a feature for each image extracted by the feature extraction unit 2 (see FIG. 3), a selected point condition table 73 to select a the number of persons from a large number of images (see FIG. 5A), a selected point feature table 74 indicating, based on the selected point condition table 73, a reference value of the feature (see FIG. 5B), a selected image flag/the number of persons table 75 used for the number of persons input image selection unit 4 to select an image (see FIG. 7), a work table for selected image flag 76 (see FIG. 9), and a feature/person-number function 77 generated by the feature/person-number function generation unit 6.

The crowd monitoring system MS monitors a crowd including a plurality of moving bodies in the present embodiment, and the moving bodies are not limited to humans, and may be animals and bicycles ridden by humans. Furthermore, the moving bodies may be vehicles travelling on a road.

The component elements of the first embodiment will be described in order. Note that, here, it is assumed that an image is photographed by a camera installed at a place where a crowd gathers, such as a station. Furthermore, the number of pixels of edges extracted from the image is used as a feature.

The image input unit 1 is to input an image photographed by a surveillance camera or the like. The image may be directly input from the surveillance camera, or video data temporarily stored in video record unit (not illustrated) may be input.

The feature extraction unit 2 is to extract a feature from the image input from the image input unit 1, and to output the feature for each image as the image feature table 72.

FIGS. 2A and 2B are diagrams illustrating an example in which edges are extracted from an image photographing a crowd, FIG. 2A is an image photographing a crowd, and FIG. 2B is an example of an image obtained by extracting edges from the image of FIG. 2A. The feature extraction unit 2 extracts a pixel having a large luminance gradient using an edge filter from an input image 21 photographing a crowd, and outputs the result as an edge image 22. As a method for extracting edges, any one of common methods as described in "Digital image processing" CG-ARTS society. As indicated by the edge image 22, the extracted edges represent outlines of person regions, and an edge amount is increased or decreased as the number of persons is increased or decreased. The present embodiment is to estimate the number of persons from an edge amount in an image newly input using the character that the edge amount in the image relates to the number of persons as described above.

Note that, an edge amount is used as a feature in the present embodiment, but an area of a person region occupying an image or the number of corners extracted from an image may be used as other features.

Figure 3:
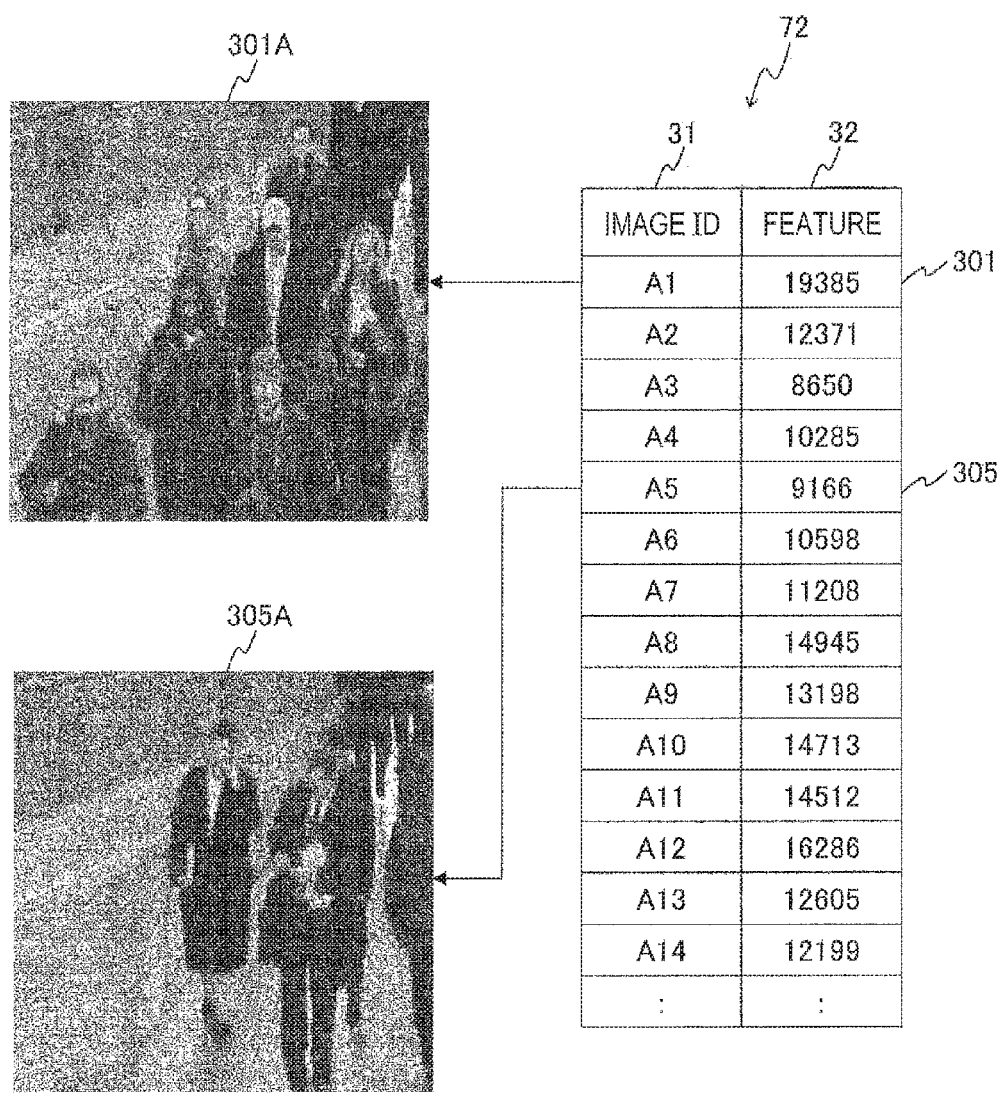
FIG. 3 is a diagram illustrating an example of an image feature table.

FIG. 3 is a diagram illustrating an example of an image feature table. The image feature table 72 includes an image ID 31 and a feature 32. The image ID 31 is to identify an image, and the image can be uniquely specified with the ID. The feature 32 is a value of a feature. The feature extraction unit 2 counts the number of white pixels extracted as edges in a screen from the edge image 22 generated from the image 21 identified by the image ID 31, and stores the number in the feature 32. A specific example will be described with reference to FIG. 2. When it is assumed that the image ID of the image 21 in FIG. 2 is A1, the feature extraction unit 2 counts (extracts) the number of white pixels representing edges in the edge image 22 generated by the feature extraction unit 2, and stores the acquired number of pixels in the feature 32. By referring to the image feature table 72, the information indicating that the image ID "A1" is an image 301A and the feature value thereof is "19385" can be uniquely acquired with reference to, for example, a record 301. Images capable of being identified by the image IDs are also stored in the storage unit 7, and can be called by selecting an image ID.

Next, the number of persons input image selection unit 4 (sample image selection unit) will be described. The number of persons input image selection unit 4 is to select an image for inputting the number of persons (sample image) based on a feature value for each image by referring to the image feature table 72.

The purpose of this unit is to set the distribution of the feature value in the image feature table 72 as a population and to extract a sampling distribution capable of representing the population distribution. An example of an embodiment of a method for extracting a sample representing features of a population distribution will be described below.

Figure 6A:
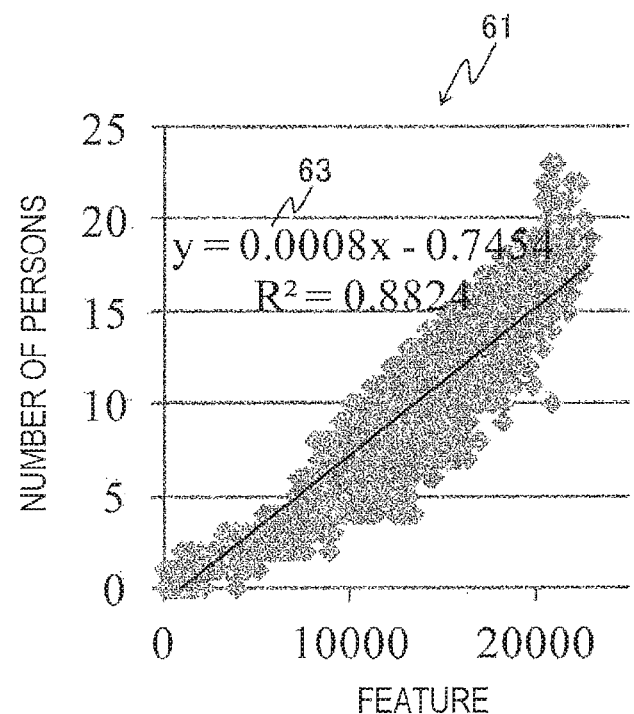
FIGS. 6A and 6B are examples of scatter diagrams plotting a relation between a feature and the number of persons in an image photographed under an installation condition of a surveillance camera.
Figure 6B:
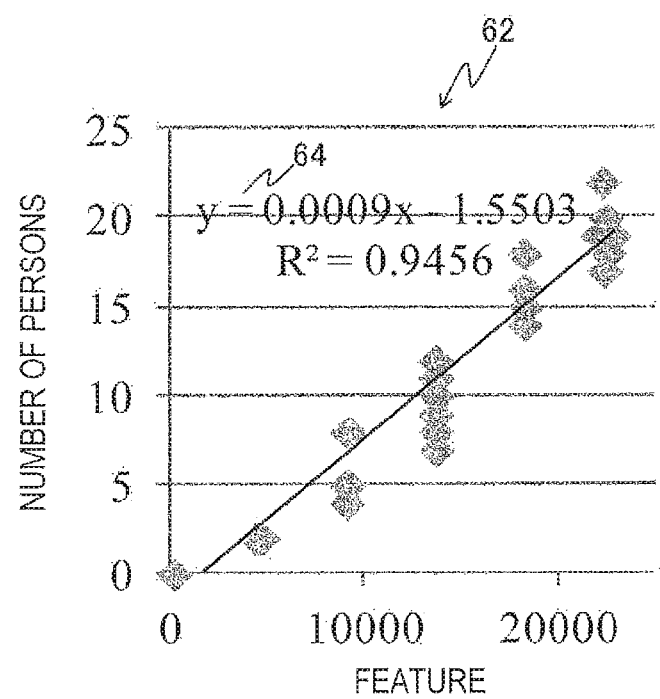

FIGS. 6A and 6B are examples of scatter diagrams plotting a relation between a feature and the number of persons in an image photographed under an installation condition of a surveillance camera, FIG. 6A is a case of a population including 2,000 or more data, and FIG. 6B is a case based on 36 samples extracted from the population of FIG. 6A in a predetermined method.

It is assumed that a graph 61 in FIG. 6A is a scatter diagram plotting the relation between a feature and the number of persons after the feature is extracted from a large number of images photographed under an installation condition of a surveillance camera and the number of persons for each image is input. The graph 61 is a population including 2,000 or more data. In contrast, a graph 62 is a scatter diagram plotting the relation between a feature and the number of persons of 36 samples extracted from the population in the graph 61 based on the feature in a method described later.

Furthermore, in the graph, an expression 63 is an approximate expression of the relation between the feature and the number of persons obtained from the distribution of the graph 61, and an expression 64 is an approximate expression of the relation between the feature and the number of persons obtained from the distribution of the graph 62. The obtained expression 64 is an approximate expression quite similar to the expression 63. As described above, samples are extracted to obtain an approximate expression having a high degree of similarity to the approximate expression obtained from a large number of populations.

The number of persons input image selection unit 4 is to extract sample images. The number of persons input image selection unit 4 obtains the maximum value of the population, and selects N sample images from each point dispersed from the maximum value. With this procedure, a small number of sample images can be extracted from the population including 2,000 or more data. An example will be specifically described below.

Figure 4:
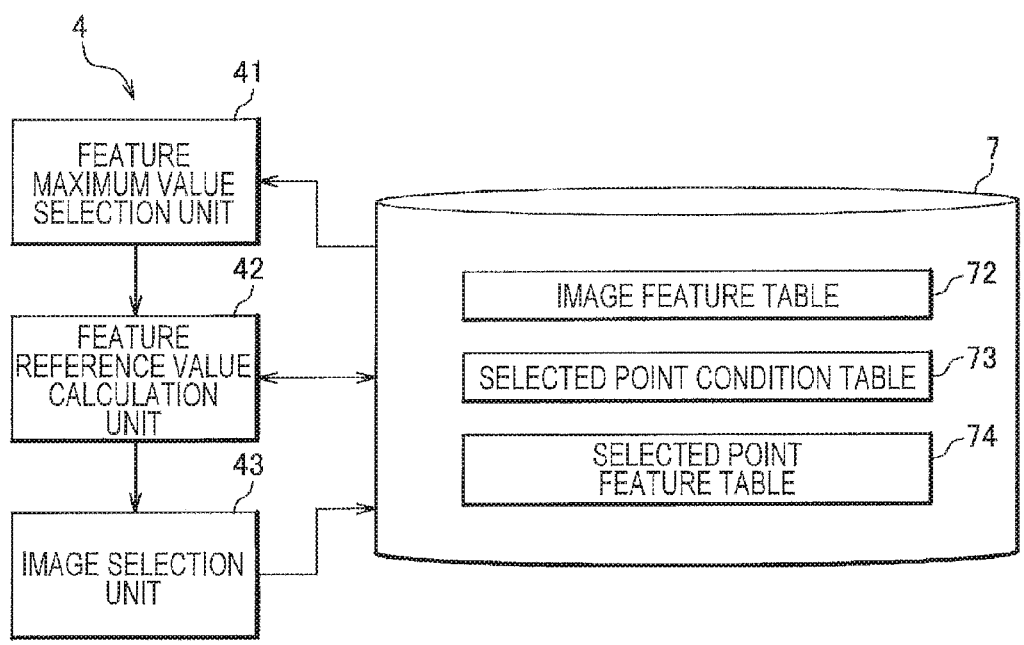
FIG. 4 is a diagram illustrating a detailed configuration of the number of persons input image selection unit.

FIG. 4 is a diagram illustrating a detailed configuration of the number of persons input image selection unit. The number of persons input image selection unit 4 includes feature maximum value selection unit 41, feature reference value calculation unit 42, and image selection unit 43 to select sample images. The feature maximum value selection unit 41 selects the maximum value of the features from the features in the image feature table 72.

Figure 5A:
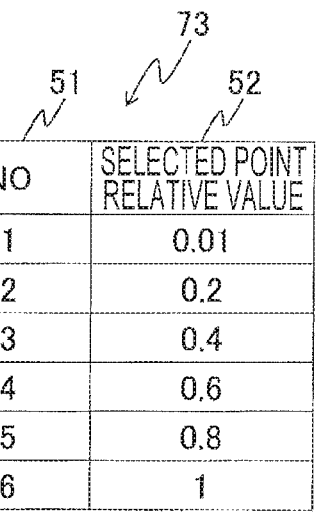
FIGS. 5A and 5B are diagrams illustrating a method for calculating a feature at a selected point.
Figure 5B:
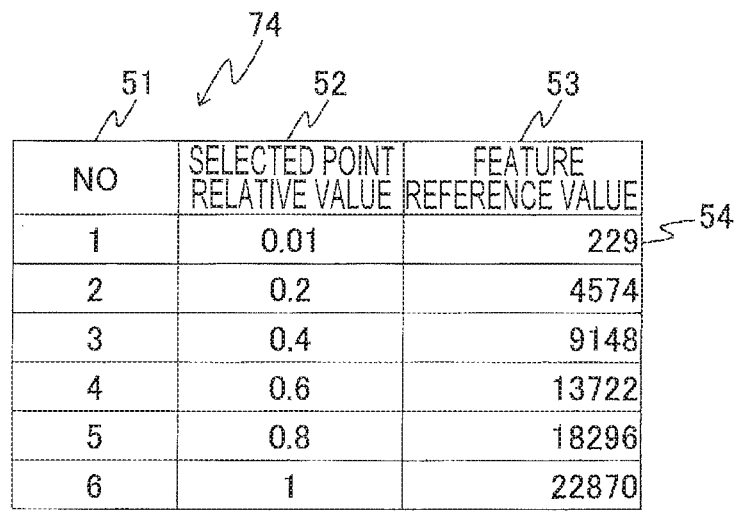

FIGS. 5A and 5B are diagrams illustrating a method for calculating a feature at a selected point, FIG. 5A is a diagram illustrating an example of a selected point condition table, and FIG. 5B is a diagram illustrating an example of a selected point feature table. The selected point condition table 73 illustrated in FIG. 5A includes a selected point number (NO) 51, and a selected point relative value 52. A selected point relative value of the selected point relative value 52 is defined as, for example, a ratio to the maximum value, and is stored.

Referring back to FIG. 4, the feature reference value calculation unit 42 is to calculate, from the feature maximum value selected by the feature maximum value selection unit 41, a reference value of the feature which is a reference to select sample images. The feature reference value can be calculated with the following expression:

[Expression 1]

$$\text{feature reference value} = \text{feature maximum value} \times \text{selected point relative value} \quad (1)$$

For example, when the feature maximum value is "22870", the feature reference value is obtained by multiplying the feature maximum value by the selected point relative value in the selected point relative value 52. The feature reference value when it is assumed that the feature maximum value is "22870" is indicated by a feature reference value 53 in the selected point feature table 74 of FIG. 5B. The selected point feature table 74 is a table in which a row of the feature reference value 53 is added to the selected point condition table 73.

The image selection unit 43 is to select, from the image feature table 72, an image having a feature value close to the feature reference value calculated by the feature reference value calculation unit 42 as a sample image. The image selection unit 43 can use a method, among various implementation methods, in which, for example, the image feature table 72 has been sorted with the feature values, a record having the closest value to the feature reference value, and N records before and after the record are selected. The selected images are flagged in a row of a selected image flag 33 in the selected image flag/the number of persons table 75 (see FIG. 7). A specific example of the above processing flow of the number of persons input image selection unit 4 will be described with reference to FIGS. 7 and 8.

Figure 8:
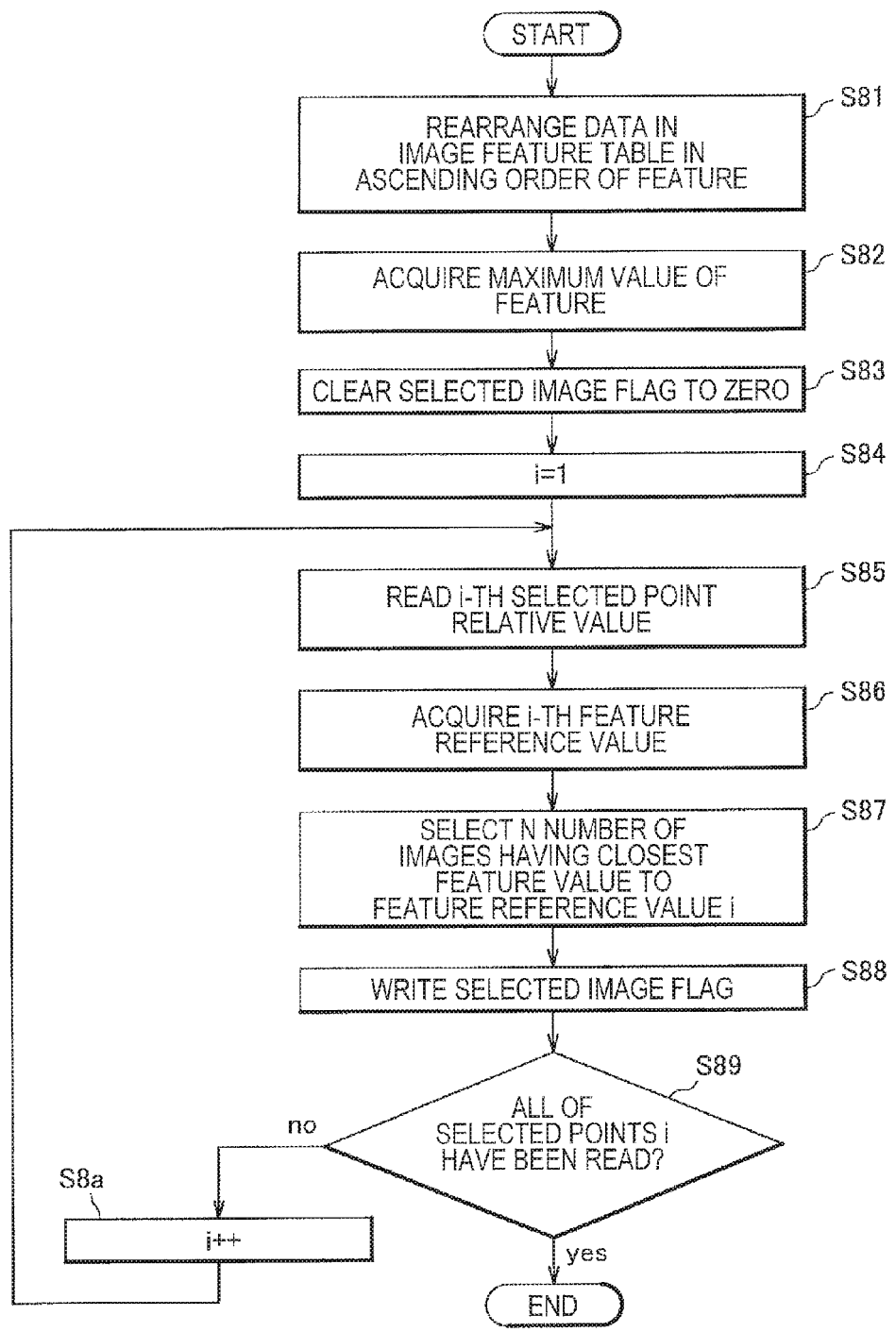
FIG. 8 is a flowchart illustrating processing of the number of persons input image selection unit.

FIG. 7 is an example of a selected image flag/the number of persons table in which input data is rearranged in ascending order of the feature. FIG. 8 is a flowchart illustrating the processing of the number of persons input image selection unit.

The selected image flag/the number of persons table 75 illustrated in FIG. 7 includes the image ID 31, the feature 32, the selected image flag 33, the display unit 3, and a the number of persons 34 input through the number of persons input reception unit 5.

The number of persons input image selection unit 4 rearranges the data in the image feature table 72 (see FIG. 3) in ascending order of the feature (S81). The selected image flag/the number of persons table 75 illustrated in FIG. 7 is rearranged in ascending order of the feature value.

The number of persons input image selection unit 4 acquires the maximum value of the feature (S82). The selected image flag/the number of persons table 75 illustrated in FIG. 7 is rearranged in ascending order of the feature, and the maximum value is the value "22870" of a record 3742 at the bottom.

The number of persons input image selection unit 4 clears a "selected image flag" in the selected image flag 33 in the selected image flag/the number of persons table 75 to zero (S83). The state after the present processing is shown in the selected image flag 33 illustrated in FIG. 7.

The number of persons input image selection unit 4 resets a counter i to sequentially read the selected points to one (S84), and reads the i-th selected point from the selected point feature table 74 (see FIG. 5B). In the case of i=1, the selected point relative value "0.01" in the selected point relative value 52 is read from the first data of a record 54 in FIG. 5 (S85).

The number of persons input image selection unit 4 acquires the i-th feature reference value from the i-th selected point relative value acquired in S85 (S86). Specifically, referring to FIG. 5B, the feature reference value "229" corresponding to the first selected point relative value "0.01" acquired in S85 is acquired. Note that, the processing in S85 may be omitted.

The number of persons input image selection unit 4 selects N images having the feature values closest to the feature reference value i (S87). The number of persons input image selection unit 4 calculates, referring to the selected image flag/the number of persons table 75, errors between the feature 32 of each record and the i-th feature reference value "229" acquired in S86, and selects the N records in ascending order of the error. Then, the number of persons input image selection unit 4 writes a flag indicating that the image selected in S87 has been selected (S88). Specifically, the N images selected in S87 and having small errors are flagged in the selected image flag 33 as "1".

FIG. 9 is a diagram illustrating an example of a work table for selected image flag at the time when processing in S88 is terminated. The work table for selected image flag 76 includes the image ID 31, the feature 32, an error 35, and the selected image flag 33. The row of the error 35 is provided as a storage region for a work which stores errors between the feature of each image and the feature reference value used in the processing of the number of persons input image selection unit 4. In FIG. 9, the selected image flag "1" is written in six records 95, 96, 97, 98, 99, and 9a which have small error values.

Referring back to FIG. 8, the number of persons input image selection unit 4 determines whether all of the selected points i have been read (S89). When all of the selected points i have been read (S89, yes), the present processing is terminated, and if not (S89, no), the processing proceeds to S8a. The number of persons input image selection unit 4 increments the counter i to read the selected point by one (S8a). Then, the processing returns back to S85, and the number of persons input image selection unit 4 performs the processing to the next selected point i.

With the above processing of the number of persons input image selection unit 4, the N sample images can be selected at each selected point in the selected point feature table 74 (see FIG. 5B).

Note that, the number of the selected points and the number of the N sample images selected at each selected point which are set in advance here are to be set so that the degree of similarity to the approximate expression generated from the population can be high as described in FIG. 6.

The number of selected points can be theoretically obtained from two points of the maximum value and the minimum value which is not zero (about 0.1) when the approximate expression is linear. However, it is preferable that four or more points are set taking the accuracy of the approximate expression into consideration. The interval of the selected points is set as the even interval so as to be 1.0, 0.8, 0.6 . . . in the above example. However, the interval in a region where the accuracy needs to be increased may be set as a fine interval, instead of the even interval, so as to be 1.0, 0.9, 0.8, 0.5, 0.25, 0.1 . . . when it is important to increase the accuracy in a congestion region.

The number of the N images selected at each selected point can be set by using the theory of the t-distribution which indicates the relation between the mean of the population and sample, and the standard deviation as described in "Imigawakaru toukei kaiseki" Chapter 5, section 5, Beret Publishing Co., Ltd. and the like.

When it is desired that the mean value of the sample is not greatly different from the mean value of the population, a sample size (the number of samples N) required for the mean value of samples to be within a certain error range can be obtained by specifying the margin of error ($\delta$), the confidence coefficient ($1-\alpha$) (Note that, $0<\alpha<1$), and the standard deviation ($\sigma$).

When the population variance is not known, interval estimation of the population mean can be obtained by the following expression:

[Expression 2]

$$\overline{x} - t(n-1, \alpha)\sqrt{\frac{V}{n}} \leq \mu \leq \overline{x} + t(n-1, \alpha)\sqrt{\frac{V}{n}} \quad (2)$$

where
$\mu$: population mean
$V$: unbiased variance
$\alpha$: 1−confidence coefficient
$\overline{x}$: sample mean
$t(n-1, \alpha)$: two-sided $100\alpha$ % point in t-distribution of degree of freedom $n-1$ Note that, when the samples are ideally extracted from the population, the population mean and the sample mean are to be equal. When n samples are extracted so that the sample mean is to be equal to the population mean, n−1 samples can be freely extracted, but the n-th sample is restricted and cannot be freely extracted. This n−1 is called the degree of freedom.

From the expression (2), the following expression with respect to the number of samples N can be established.

[Expression 3]

$$N \geq \left(\frac{Z_{\alpha/2}\sigma_0}{\delta}\right)^2 \quad (3)$$

where
$Z_{\alpha/2}$: upper $\alpha/2$% point in standard normal distribution
$\sigma_0$: standard deviation of population
$\delta$: error of sample mean relative to population mean With the expression (3), by assuming the values of the standard deviation ($\sigma(=\sigma_0)$), the margin of error ($\delta$), and the confidence coefficient ($1-\alpha$), the necessary number of samples N can be obtained. For example, when the standard deviation is 3, the margin of error is 5, and the confidence coefficient is 99%, the value of N becomes "6".

The above values to be assumed are determined in advance from the accuracy of the necessary congestion degree by assuming the standard deviation of the population according to a preparatory experiment, and then the value of the number of samples N is obtained.

With the above unit, it is possible to disperse the selected points to extract the samples from a large number of populations, and to extract, at each selected point, the number of samples to reduce the error from the population mean, and thus it is possible to obtain an accurate approximate expression with a small number of samples.

Note that, as a method for extracting the number of samples N at each selected point, it has been described the method in which the records having small errors from the feature reference value are selected. In addition to this method, there is another method in which a photographing time of an image other than a feature is included in the image feature table 72, and when images photographed at close times (for example, within a several seconds) are included in the N selected sample points, either image is excluded from the selected images, and an image having the next smallest error is to be the selected image. The images having the close photographing times are almost the same images since the photographed crowd rarely move, and it is expected that the effect to obtain the dispersed samples is reduced. Thus, the above described method is efficient.

Next, the number of persons input reception unit 5 (total number input reception unit) will be described. The number of persons input reception unit 5 is to present the image selected by the number of persons input image selection unit 4 to a user, and to receive an input of the number of persons photographed in the image.

Figure 10:
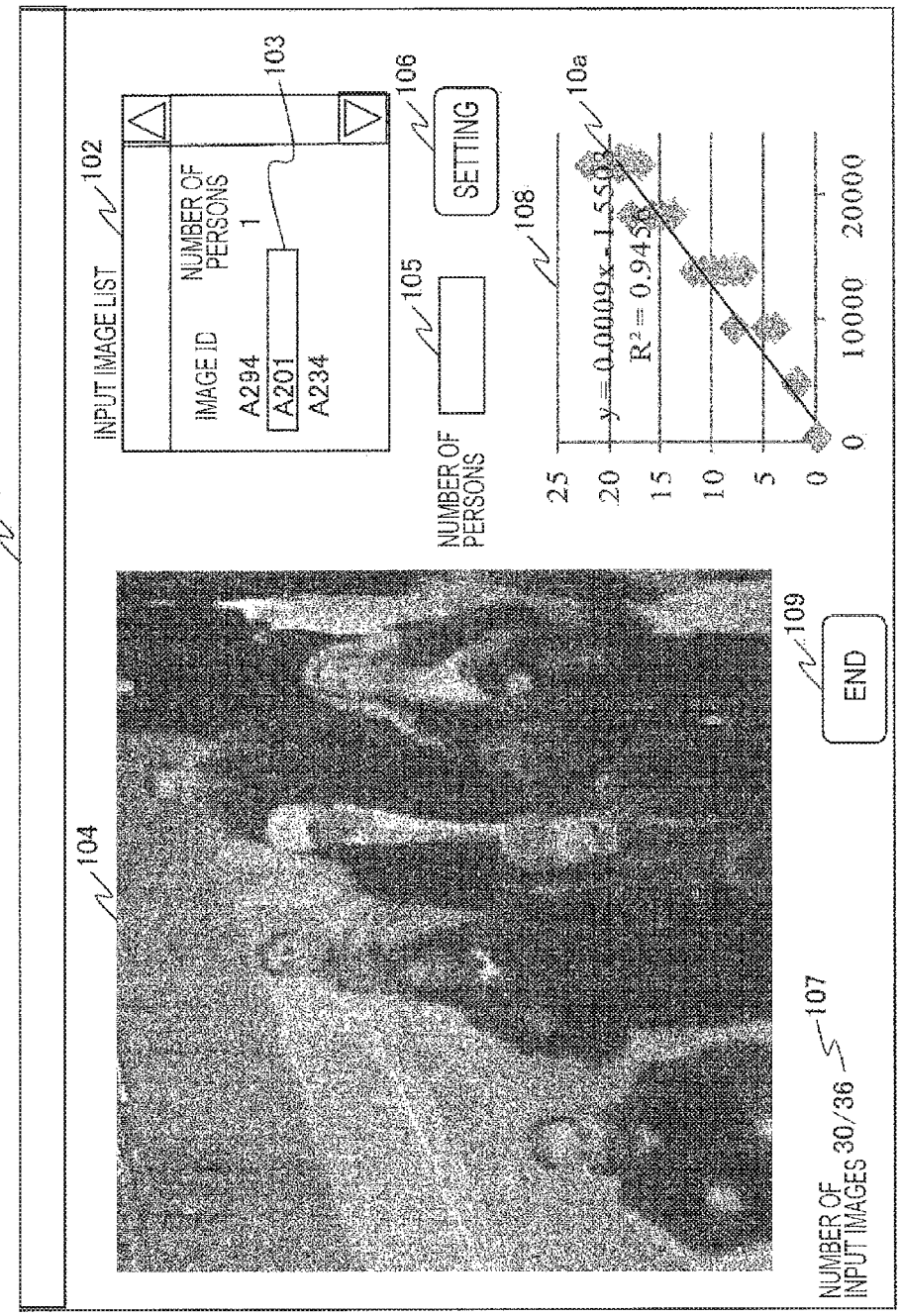
FIG. 10 is a diagram illustrating a screen example of the number of persons input reception unit.

FIG. 10 is a diagram illustrating a screen example of the number of persons input reception unit. The screen example illustrated in FIG. 10 is to be displayed on the display unit 3 by the number of persons input reception unit 5. A window 101 is to display an image for the user to input the number of persons, and to receive the number of persons input by the user. The number of persons input reception unit 5 calls image IDs having the selected image flag "1" referring to the selected image flag/the number of persons table 75, and displays the image IDs in an input image list 102. In the input image list 102, when the user selects an image ID, the number of persons input reception unit 5 receives the selected image ID, and displays the corresponding image in a window 104. The user counts the number of persons in the image displayed in the window 104, inputs the number of persons in a text box 105, and pushes a "setting" button 106. By pushing the "setting" button 106, the number of persons input in the text box 105 is set as the value of the number of persons 34 of the corresponding image ID "A201" in the selected image flag/the number of persons table 75. The input value is displayed in the input image list 102.

As one of embodiments of the unit, there is user input assistance which visualizes the progress of inputting the number of persons by displaying, in an input image number 107, the number of images whose number of persons has been input among the images having the selected image flag "1".

By pushing an "end" button 109 when the numbers of persons of all images have been input, the processing of the number of persons input reception unit 5 is terminated. When there is an image having the selected image flag "1" whose number of persons is not set at the time of pushing the "end" button 109, an alarm indicating, for example, "there is an unset image" may be displayed for the user.

Figure 11:
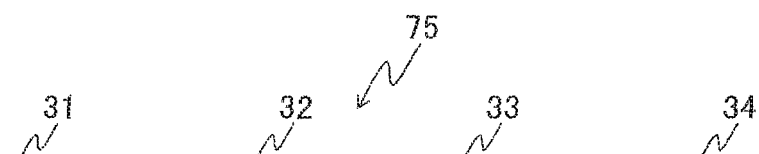
FIG. 11 is a diagram illustrating an example of a selected image flag/the number of persons table at the time when the number of persons is input.

The selected image flag/the number of persons table 75 at the time when the numbers of persons are input by the above processing of the number of persons input reception unit 5 is illustrated in FIG. 11. The numbers of persons of the images having the selected image flag "1" in the selected image flag 33 are input in the row of the number of persons 34.

The processing of the number of persons input reception unit 5 has been described above, and as user input assistance of this unit, a scatter diagram between the feature and the number of persons may be displayed using the input true-value data as indicated by a graph 108 in FIG. 10. Further-more, an approximate expression of the relation between the feature and the number of persons may be also displayed as indicated by an expression 10a. The method for calculating the approximate expression will be described in the description of the feature/person-number function generation unit 6. The user performs the input while checking the relation between the number of persons input in this manner and the feature, and thereby it is possible to prevent from mistakes with the input assistance.

Furthermore, in the above the number of persons input reception unit 5, it has been described the example in which a fixed number of selected images are displayed to perform the input, but the embodiment is not necessarily limited to this. For example, since the error from the population mean value can be reduced as the number of samples N at each selected point is increased, the user may input the numbers of persons of more images, if the user has time to spare to perform the input.

The number of persons input image selection unit 4 flags the minimum number of samples N required to be selected as the selected image flag "1", then, further selects, at each selected point, M images which have the smallest errors next to the N images, and flags the images as a selected image flag "2".

FIG. 12 is a diagram illustrating an example of a selected image flag/the number of persons table when a selected image flag is "2". In the selected image flag/the number of persons table 75 illustrated in FIG. 12, compared to the selected image flag/the number of persons table 75 illustrated in FIG. 11, the selected image flag "2" is set in records 121 and 122. Referring to FIG. 12, the records 121 and 122 are adjacent to the records to which the selected image flag "1" is set.

Figure 13:
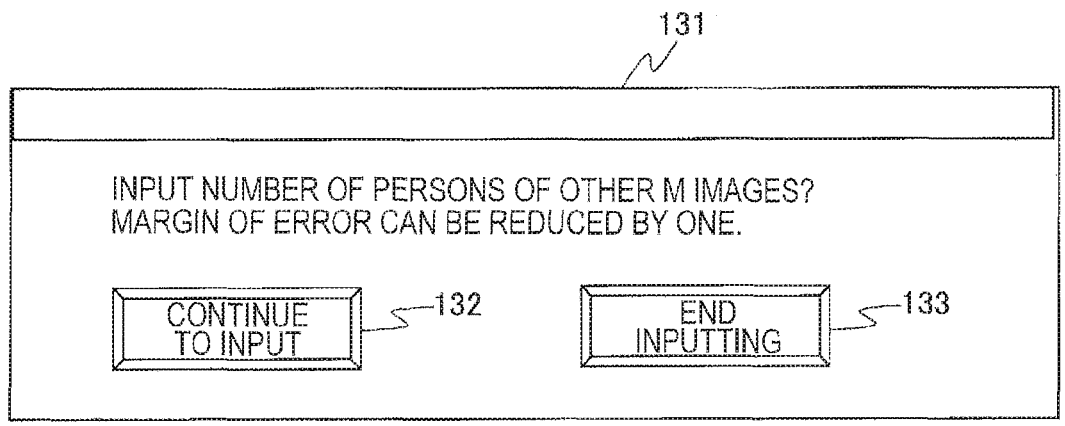
FIG. 13 is a diagram illustrating an example of a message box to be displayed when an "end" button in FIG. 10 is pushed.

The number of persons input reception unit 5 displays a message box 131 as illustrated in FIG. 13 when the number of persons of the image having the selected image flag "1" is input in the above processing of the number of persons input reception unit 5 and the "end" button 109 in FIG. 10 is pushed.

FIG. 13 is a diagram illustrating an example of a message box to be displayed when the "end" button 109 of FIG. 10 is pushed. The message box 131 includes a "continue to input" button 132 and an "end inputting" button 133. When the user pushes the "continue to input" button 132 to continue the input, the input screen in FIG. 10 is displayed again, an image list in which the selected image flag 33 is "2" in the selected image flag/the number of persons table 75 illustrated in FIG. 12 (see the record 121 and the record 122) is created and displayed, and the above processing of the number of persons input reception unit 5 is similarly continued. On the other hand, when the "end inputting" button 133 is pushed, the window in FIG. 10 is closed, and the processing of the number of persons input reception unit 5 is terminated.

With the above embodiment, it is possible for the user to input the prioritized the numbers of persons within a reasonable range, and to improve the accuracy of the approximate expression of the feature/person number. Note that, the selected image flag is set as "1" or "2" as illustrated in FIG. 12 in the above example, but is not limited to these two values and may be flagged according to the degree of priority. An embodiment in which all image IDs are prioritized can be possible.

Next, the feature/person-number function generation unit 6 (feature/total number function generation unit) will be described. The feature/person-number function generation unit 6 is to obtain a function of the feature and the number of persons by obtaining a regression expression from the relation between the number of persons input by the number of persons input reception unit 5 and the feature.

When it is assumed that the feature is xi, and the number of persons is yi (i=1, 2, . . . , n), the regression expression y=a+bx (a: intercept, b: regression coefficient) can be obtained with the following expression:

[Expression 4]

$$\text{regression coefficient } b = \frac{\sum (xi - \bar{x})(yi - \bar{y})}{\sum (xi - \bar{x})} \\ \text{intercept } a = \bar{y} - b\bar{x}$$ (4)

The regression expression is calculated from the number of persons input by the user with the number of persons input reception unit 5 and the value of the feature using the expression (4). The relation between the feature of the data input by the number of persons input reception unit 5 and the number of persons is indicated by the graph 62 in FIG. 6, and the regression expression calculated from the data using the expression (4) is the following expression:

[Expression 5]

$$y=0.0009x-1.5503$$ (5)

The feature/person-number function generation unit 6 stores the calculated regression expression in the storage unit 7 as the feature/person-number function 77. With the stored regression expression, the number of persons can be estimated hereafter from the feature, from which the regression expression is generated, of the image photographed by a surveillance camera. Note that, it has been described that the regression expression generated by the feature/person-number function generation unit 6 is a linear function indicated by the expression (5), but the regression expression is not limited to this, and may be, for example, a quadratic regression expression.

The number of edge pixels extracted from the input image is used as the feature in the above embodiment, but the feature is not limited to this, and may be an area of a person region extracted from the input image (the number of pixels) or the number of corners extracted from the input image.

The number of edge pixels extracted from the input image is directly used as the feature in the above embodiment. This embodiment is effective when there are small amounts of edges in a background except for a person. However, in the condition that the amount of edges extracted from a background is too large to ignore, for example, when the texture of the floor tiles is complicated, the amount of edges in the background can cause an error of estimating the number of persons. In this case, unit, in which a person region is extracted in advance by a method of an inter-frame difference or a background difference, and the number of edge pixels only in the person region is counted, is effective.

The value of the number of edge pixels extracted by the feature extraction unit 2 is directly used in the above embodiment, the outline based on the edges makes a person in the depth of the screen small and a person in the front of the screen big, and the number of edge pixels per person greatly varies between the depth side and the front side of the screen. Especially, an embodiment in which the estimation accuracy of the number of persons is to be improved by normalizing the number of edge pixels per person in the screen when the depression angle of the camera is shallow can be possible.

As a depth correction method, geometric transformation using a camera installation condition, such as a depression angle, is required to perform the calculation correctly as disclosed in NPL 1, but a simple method as disclosed in NPL 2 which can be used when the camera installation condition of the video is unknown.

NPL 1: Kiyotaka WATANABE and Tetsuji HAGA, "Crowd monitoring system by video analysis" The 14th Symposium on Sensing via Image Information, June, 2008

NPL 2: Antoni B. Chan, Zhang-Sheng John Liang, and Nuno Vasconcelos, "Privacy Preserving Crowd Monitoring Counting People without People Models or Tracking" CVPR2008, pp. 1-7, June 2008

When using the method of NPL 2, by gradually weighting the Y coordinates from the front to the depth of the screen based on the position of the y coordinate at the front side of the screen, each of the y coordinates in the screen is normalized. The calculation is based on the assumption that the weight linearly varies from the front to the depth of the screen based on the ratio of the heights of the same person observed in the front and in the depth of the screen.

FIGS. 16A and 16B are diagrams of images that are photographed by the same camera at different times. In FIGS. 16A and 16B, it is assumed that images 167 and 168 are photographed by the same camera at different times. Furthermore, it is assumed that persons 161 and 162 in the image are the same person at different positions. Here, it is assumed that when the lateral direction is an X axis, and the vertical direction is a Y axis setting a lower left of the image as an origin, a Y coordinate 165 at the foot of the person 162 in the image 168 is y1, and a height 166 of the person 162 in the image is h1. Similarly, it is assumed that a Y coordinate 163 at the foot of the person 161 in the image 167 is y2, and a height 164 of the person 161 in the image is h2. To normalize the sizes of the person 161 and the person 162 in the image, the calculation is performed based on the assumption that the weight of the pixel on the Y coordinate y1 is 1 and the weight of the pixel on the Y coordinate y2 is h1/h2. It is assumed that the weight is in proportional to the Y coordinate and linearly varies, and a weight W of each Y coordinate can be calculated with the following expression:

[Expression 6]

$$\text{weight: } W = A \times y + B$$ (6)

where $$A = \frac{1 - \frac{h1}{h2}}{y1 - y2}$$

$$B = 1 - \left(\frac{1 - \frac{h1}{h2}}{y1 - y2}\right) y1$$

Based on the expression (6), the weight W of each y coordinate is obtained in advance from an image photographing persons having the same height, or the same pole at different positions in the depth direction. When the feature extraction unit 2 of FIG. 1 extracts the edge feature and counts the number of pixels, the calculation is performed by multiplying the number of edge pixels by the weight as indicated by the expression (7).

[Expression 7]

weighted number of pixels: $Npw=\Sigma_{y=1}^{Y}$(weight of y coordinate×number of edge pixels in y coordinate) (7)

where
y: y coordinate
Y: maximum value of y coordinate in screen

With the embodiment in which the weight in the depth direction is taken into consideration, it is possible to more accurately estimate the number of persons.

With the crowd monitoring system MS in the first embodiment, it is possible to accurately estimate the congestion degree by inputting the numbers of persons of small number of samples, and reduce a parameter setting cost.

Second Embodiment

Figure 14:
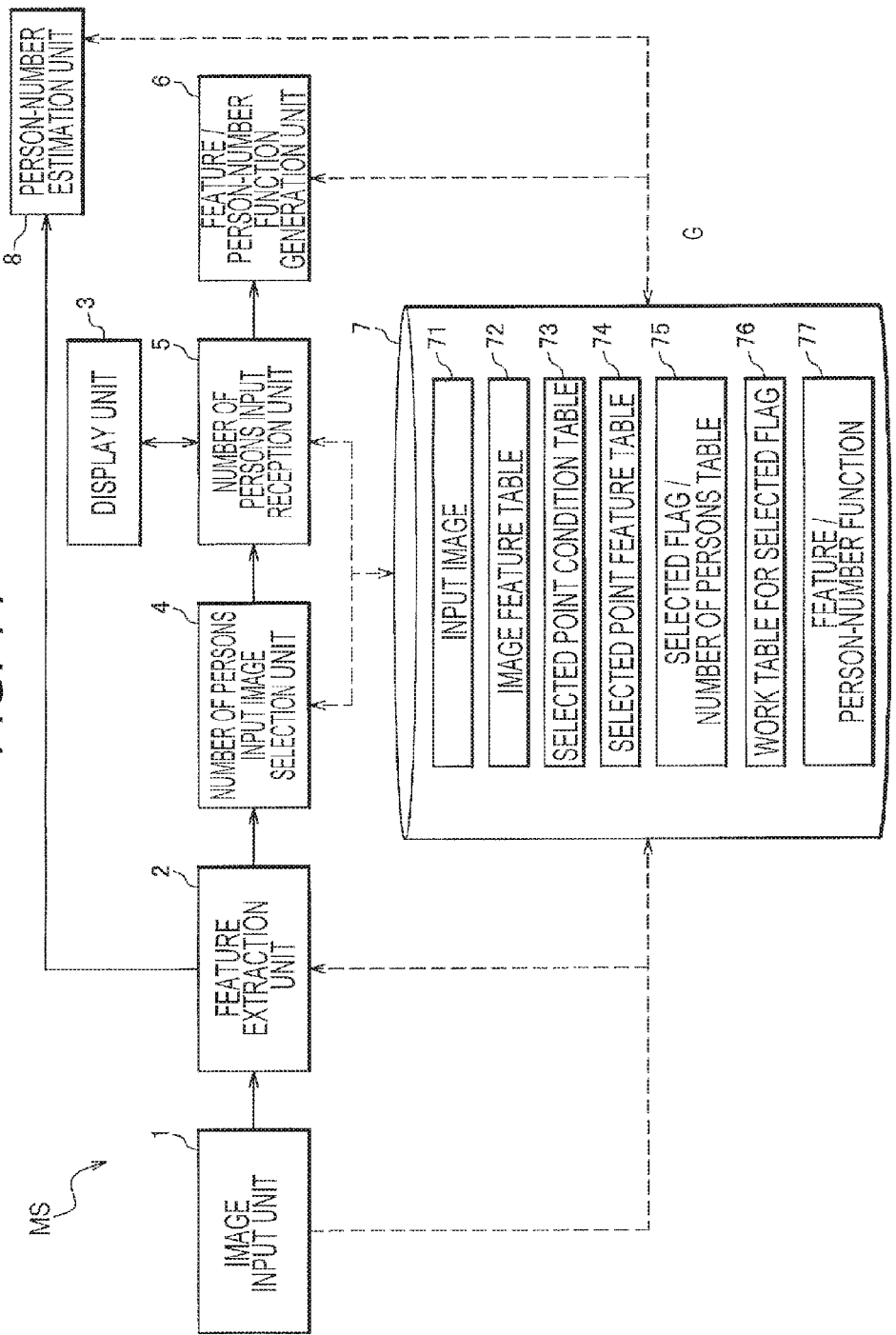
FIG. 14 is a block diagram illustrating a configuration of a second embodiment of a crowd monitoring system according to the present invention.

FIG. 14 is a block diagram illustrating a configuration of a second embodiment of a crowd monitoring system according to the present invention. In the configuration of the second embodiment, person-number estimation unit 8 is added to the configuration of the first embodiment illustrated in FIG. 1. The second embodiment is to estimate the number of persons or the congestion degree using a feature/person-number function 77 generated in the first embodiment. The same reference signs are assigned to the same elements as those in the first embodiment illustrated in FIG. 1, and the redundant description is omitted.

The person-number estimation unit 8 is to extract a feature from an image input by image input unit 1 with feature extraction unit 2, and to estimate the number of persons based on the value of the extracted feature and the feature/person-number function 77.

FIGS. 15A and 15B are diagrams illustrating another example in which edges are extracted from an image photographing a crowd, FIG. 15A is an example of an input image, and FIG. 15B is an example of an image obtained by extracting edges from the input image. The feature extraction unit 2 generates an edge image 152 in FIG. 15B from an input image 151 photographing a crowd.

When it is assumed that the number of pixels of the edge (white) in the edge image 152 is "8269" pixels, the person-number estimation unit 8 calls the feature/person-number function 77 (for example, the regression expression of the expression (5)) in storage unit 7, and the number of persons "5.89"≈6 can be calculated by substituting "8269" for a feature x.

In the crowd monitoring system MS in the second embodiment, it has been described the example in which a regression expression per surveillance camera is stored in the feature/person-number function 77, but the embodiment is not necessarily limited to this. In the present embodiment, a feature of edges or the like is extracted from an image of a person, and a tendency of the feature can be different according to an appearance of the image, such as a size of a person to be measured or its clothes. Thus, there is another possible embodiment in which a regression expression is generated for each of seasons, days of a week, and time periods which are the factor making persons' clothes or a percentage of children, and the regression expression satisfying the condition is used when the person-number estimation unit 8 estimates the number of persons.

In this case, the processing of the image input unit 1, the feature extraction unit 2, the number of persons input image selection unit 4, the number of persons input reception unit 5, and feature/person-number function generation unit 6 which are illustrated in FIG. 14, is divided by conditions, and the divided processing is performed for each combination of a season, a day of a week, and a time period, and the feature/person-number function 77 is stored in the storage unit 7 together with the conditions. In the processing of the person-number estimation unit 8 to estimate the number of persons, date and time information is acquired together with the image input by the image input unit 1, and is passed to the person-number estimation unit 8 together with feature value information, and the person-number estimation unit 8 refers to the passed date and time information, selects the regression expression satisfying the condition, and estimates the number of persons.

Third Embodiment

The first and second embodiments are based on the assumption that a feature is extractable from a two-dimensional image, such as edges, corners, an area of person region, as the feature extracted by the feature extraction unit 2, and a third embodiment is in the case in which distance information for each pixel can be acquired in addition to a feature of a two-dimensional.

There are methods for acquiring a distance image by calculating parallax using two cameras, and by combination of a projector called an active stereo and a camera photographing it. These are described in "Digital image processing" chapter 15 and the like, CG-ARTS society and the like. The present embodiment uses either of the above two methods, and the case in which two kinds of images of a normal two-dimensional image and a distance image can be acquired is exemplified. The present processing is an embodiment corresponding to feature extraction unit 2 in FIG. 1. In the present embodiment, by weighting a feature extracted from the two-dimensional image by a distance value obtained from the distance image, it is possible to normalize the difference in sizes according to the distance of the feature acquired from the image. The processing flow of the feature extraction unit 2 according to the third embodiment will be described with reference to FIGS. 17 and 18.

Figure 17A:
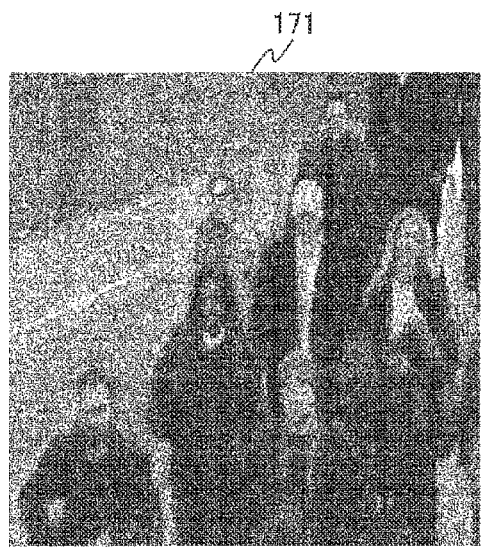
FIGS. 17A to 17C are diagrams explaining an image to be input in a third embodiment.
Figure 17B:
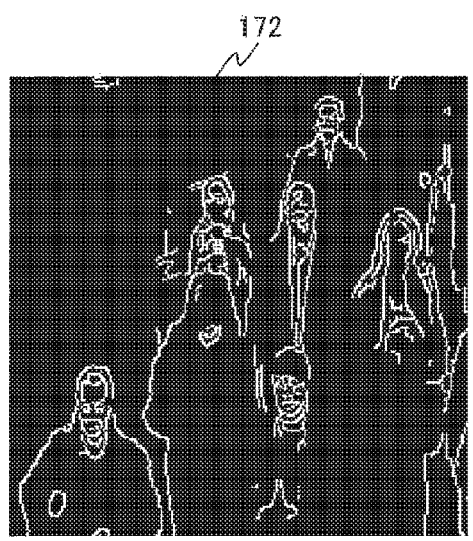
Figure 17C:
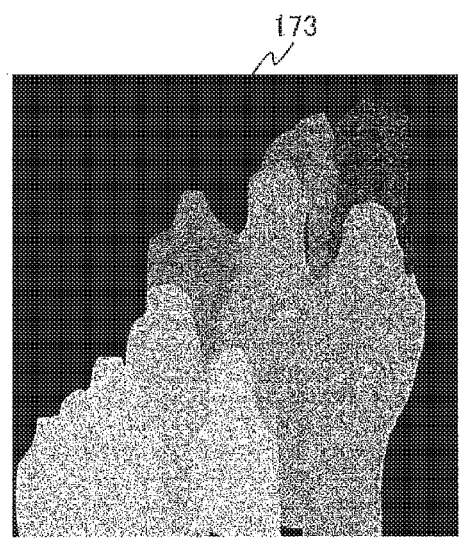
Figure 18:
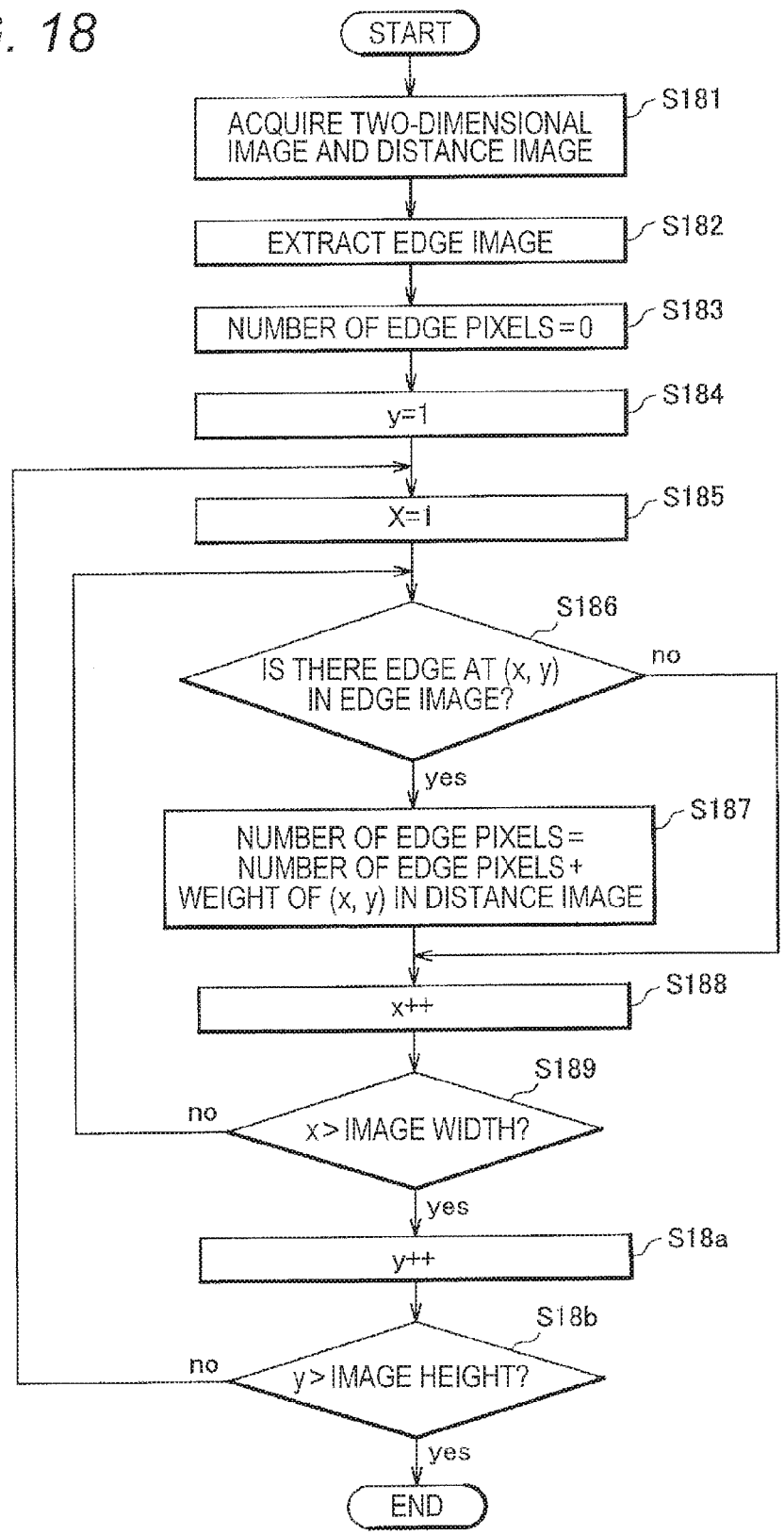
FIG. 18 is a flowchart explaining processing of feature extraction unit according to the third embodiment.

FIGS. 17A to 17C are diagrams explaining an image to be input in the third embodiment, FIG. 17A is a two-dimensional image, FIG. 17B is an edge image, and FIG. 17C is a distance image. FIG. 18 is a flowchart explaining processing of the feature extraction unit according to the third embodiment. The feature extraction unit 2 acquires a two-dimensional image and a distance image (S181). FIG. 17 illustrates a two-dimensional image 171, an edge image 172, and a distance image 173. The distance image 173 includes a value of parallax measured for each pixel. The value is large as the distance from a surveillance camera is close, and the color is bright as the value is large.

The feature extraction unit 2 extracts the edge image 172 from the two-dimensional image 171 (S182). This processing is the same as the normal processing in which edges are extracted from an image in the first embodiment. The extracted image is indicated by the edge image 172 (see FIG. 17B). The region from which the edges are extracted is shown in white.

The feature extraction unit 2 clears a counter to count the number of edge pixels to zero (S183). The feature extraction unit 2 initializes a reference counter y of a pixel in the height direction of the image to one (S184), and initializes a reference counter x of a pixel in the width direction in the image to one (S185).

The feature extraction unit 2 determines whether there is an edge at the coordinates (x, y) in the edge image 172 (S186). When there is an edge (S186, Yes), the processing proceeds to S187, and when there is no edge (S186, No), the processing proceeds to S188.

In S187, when determining that there is an edge at the coordinates in the edge image in S186, the feature extraction unit 2 performs the processing in which the value obtained by multiplying the weight extracted from the coordinates in the distance image 173 is added to the accumulated number of edge pixels. In S187, the value is acquired by referring to the pixel at the pixel (x, y) in the distance image 173. The purpose of multiplying the weight is to increase the weight per pixel as a person is farther from the camera. Thus, the parallax image value which is larger as a person is closer to the camera is converted into the distance with the following expression and is multiplied as the weight.

[Expression 8]

$$\text{distance} = k/\text{parallax} \quad (8)$$

where, k: constant

The expression (8) is derived from that the distance is inversely proportional to the parallax. The weight obtained in this manner is added to the accumulated number of edge pixels.

The feature extraction unit 2 adds one to the value of the reference counter x of the pixel in the width direction of the image (x++) (S188), and determines whether the value of x exceeds the value of the image width (S189). When the value of x exceeds the value of the image width (S189, yes), the processing proceeds to S18*a*, and when the value of x does not exceed the value of the image width (S189, no), the processing returns back to S186, and the processing from S186 to S188 is performed to the next (x, y) coordinates.

The feature extraction unit 2 adds one to the value of the reference counter y of the pixel in the height direction of the image (y++) (S18*a*), and determines whether the value of y exceeds the value of the image height (S18*b*). When the value of y exceeds the value of the image height (S18*b*, yes), it is determined that the processing has been performed to all of the pixels of the image, and when the value of y does not exceed the value of the image height (S18*b*, no), the processing returns back to S185, and the processing from S185 to S18*a* is performed to the next (x, y) coordinates.

The third embodiment of the crowd monitoring system MS has been described above. Since the number of persons is estimated taking the actual distance information for each pixel into consideration, it is possible to improve the estimation accuracy of the number of persons. Note that, the number of edge pixels is used as the feature of the two-dimensional image in the above example, but may be replaced with the number of corners or an area of person region similarly to the first and second embodiments.

The image of the moving bodies in the third embodiment is a distance image, and when extracting the feature, the feature extraction unit 2 can take the weight in the depth direction of the image into consideration by calculating the feature by multiplying the weight by the distance value for each pixel.

Furthermore, the feature extraction unit 2 has distance information on a background, such as floor and wall, in advance when calculating the feature, and it is possible to improve the estimation accuracy of the number of persons by excluding the distance information from the calculation of the feature when the distance value for each pixel coincides with the distance of the background.

Specifically, the feature extraction unit 2 has distance data other than the objects in the photographing field of view of the camera, such as a floor and a wall, in advance, and the distance data may be excluded from the processing of multiplying the weight and perform the addition when weighting the distance information in S187 and the distance coincides with that of the floor or wall. By adding this processing, it is possible to prevent over-detection caused by using the edges of the floor texture or the shadow to estimate the number of persons.

The image input unit 1, the feature extraction unit 2, the number of persons input image selection unit 4 (sample image selection unit), the number of persons input reception unit 5 (total number input reception unit), the feature/person-number function generation unit 6 (feature/total number function generation unit) which are described in the present embodiment can be implemented as specific unit in cooperation with software and hardware in a computer by reading a program by the computer and controlling the operation.

It has been described that the crowd monitoring system MS in the above first to third embodiments monitors the number of persons of a crowd, but the embodiments are not limited to this. The moving bodies may be vehicles traveling on a highway, products conveyed on a belt conveyer at a production site, or the like. The total number of the crowd is the number of vehicles, the number of products, or the like.

With the crowd monitoring system MS in the present embodiment, by reducing the number of image (sample images) for a user to input the numbers of persons from a large number of input images (for example, a several thousands of images), it is possible to accurately estimate the congestion degree for the crowd monitoring system MS while reducing a parameter setting cost (for example, a labor cost).

REFERENCE SIGNS LIST

1 image input unit
2 feature extraction unit
3 display unit
4 number of persons input image selection unit (sample image selection unit)
5 number of persons input reception unit (total number input reception unit)
6 feature/person-number function generation unit (feature/total number function generation unit)
7 storage unit
8 person-number estimation unit
22, 152, 172 edge image
71 image (input image)
72 image feature table
73 selected point condition table
74 selected point feature table
75 selected flag/number of persons table
76 work table for selected flag
77 feature/person-number function
173 distance image
MS crowd monitoring system

The invention claimed is:

1. A crowd monitoring system comprising:
   at least one storage medium that stores a plurality of images of a crowd, each including a plurality of moving bodies; and
   a processor coupled to the at least one storage medium, wherein the at least one storage medium further stores instructions that cause the processor to execute:

a feature extraction unit configured to extract a number of features in each of the images, a sample image selection unit to select a plurality of sample images from the images stored in the at least one storage medium based on a plurality of feature reference values which are calculated from a maximum number of the features in one of the images, a total number input reception unit to receive a total number of the moving bodies in each of the sample images, and a feature/total number function generation unit to generate a function indicating a relation between the number of features in each of the images in the storage unit and the total number of the moving bodies in each of the images in the storage unit based on the number of features in each of the sample images and the total number of the moving bodies in each of the sample images.

2. The crowd monitoring system according to claim 1, wherein the sample image selection unit sets the number of features in each of the images stored in the storage unit as a population, calculates the maximum number of the features as the number of features in a single one of the images, calculates the plurality of feature reference values which each have the number of features dispersed at predetermined intervals from the maximum number of the features, and selects the sample images where, for each respective one of the feature reference values, a predetermined number of the sample images are selected which each have a respective number of features which is closest to the respective one of the feature reference values.

3. The crowd monitoring system according to claim 2, wherein the sample image selection unit determines the predetermined number of the sample images to be selected for each of the feature reference values based on a standard deviation of the population and an acceptable error of the population in a t-distribution.

4. The crowd monitoring system according to claim 1, further comprising:

an image input unit configured to input each of the images photographed by one or more surveillance cameras to the at least one storage medium, wherein the sample image selection unit selects the sample images to have photographing times by the surveillance cameras which differ by a predetermined amount of time.

5. The crowd monitoring system according to claim 1, further comprising, wherein the feature extraction unit extracts a region of the moving bodies based on an inter-frame difference or a background difference, and extracts the number of features included in the extracted region.

6. The crowd monitoring system according to claim 1, wherein the sample image selection unit prioritizes the sample images, and wherein the total number input reception unit receives the total number of the moving bodies in descending order of the prioritized sample images.

7. The crowd monitoring system according to claim 5, wherein the number of features are one of a number of edge pixels, a number of corners, or an area of the moving bodies in the images of the crowd.

8. The crowd monitoring system according to claim 1, wherein the feature extraction unit calculates the number of features by multiplying a weight proportional to a coordinate in a height direction of the images of the crowd.

9. The crowd monitoring system according to claim 1, wherein the images stored in the at least one storage medium are photographed in different seasons, different days of a week, and different time periods, and wherein the feature/total number function generation unit generates the function for each of the seasons, the days of the week, and the time periods.

10. The crowd monitoring system according to claim 1, wherein the images of the crowd are distance images, and the feature extraction unit calculates the number of features in each of the images based on multiplying a weight by a distance value of each of the pixels in the respective images.

11. The crowd monitoring system according to claim 10, wherein the feature extraction unit has, when calculating the number of features, distance information on a background in advance, and excludes the distance value of one of the pixels, when the distance value of the one of the pixels coincides with a distance of the background from the extraction of the number of features.

12. The crowd monitoring system according to claim 1, wherein the at least one storage medium further stores instructions that cause the processor to execute:

a total number estimation unit to estimate, based on the function generated by the feature/total number function generation unit and the number of features extracted by the feature extraction unit, the respective total number of the moving bodies in each of the images stored in the at least one storage medium.

13. The crowd monitoring system according to claim 1, wherein the respective total number of the moving bodies in each of the images is a respective number of persons in each of the images.

14. The crowd monitoring system according to claim 1, wherein the respective total number of the moving bodies in each of the images is a respective number of vehicles in each of the images.

15. A crowd monitoring method, the method comprising:

providing a plurality of images of a crowd, each including a plurality of moving bodies, and a number of features in each of the images;

selecting a plurality of sample images from the images of the crowd based on a plurality of feature reference values which are calculated from a maximum number of the features in the images;

receiving a total number of the moving bodies in each of the sample images; and generating a function indicating a relation between the number of features in each of the images of the crowd and the total number of the moving bodies in each of the images of the crowd based on the number of features in each of the sample images and the total number of the moving bodies in each of the images of the crowd.

16. The crowd monitoring method according to claim 15, wherein the number of features in each of the images is set as a population, wherein the maximum number of the features is the number of features in a single one of the images, wherein the plurality of feature reference values have a number of features dispersed at predetermined intervals from the maximum number of features, and wherein, for each respective one of the feature reference values, a predetermined number of the sample images are selected which each have a respective number of features which is closest to the respective one of the feature reference values.

17. The crowd monitoring method according to claim 15, further comprising:
estimating the respective total number of the moving bodies in each of the images based on the generated function.

18. A crowd monitoring system comprising:
at least one storage medium that stores a plurality of images of a crowd, each including a plurality of moving bodies, and a number of features in each of the images; and
a processor coupled to the at least one storage medium, wherein the at least one storage medium further stores instructions that cause the processor to execute:

sample image selection means for selecting a plurality of sample images from the images based on a plurality of feature reference values which are calculated from a maximum number of the features in the images, a total number input reception unit to receive a total number of the moving bodies in each of the sample images, and a feature/total number function generation unit to generate a function indicating a relation between the number of features in each of the images in the storage unit and the total number of the moving bodies in each of the images in the storage unit based on the number of features in each of the sample images and the total number of the moving bodies in each of the sample images.

* * * * *